(12) United States Patent
Lee et al.

(10) Patent No.: US 11,047,519 B2
(45) Date of Patent: Jun. 29, 2021

(54) HOLDER FOR A TABLET ELECTRONIC DEVICE

(71) Applicant: COMARK, LLC, Milford, MA (US)

(72) Inventors: Jason Lee, New Taipei (TW); M. D. Hsu, New Taipei (TW); Dean Miller, New Taipei (TW)

(73) Assignee: Comark LLC, Milford (MA)

( * ) Notice: Subject to any disclaimer, the term of this patent is extended or adjusted under 35 U.S.C. 154(b) by 0 days.

(21) Appl. No.: 16/587,467

(22) Filed: Sep. 30, 2019

(65) Prior Publication Data
US 2021/0095811 A1 Apr. 1, 2021

(51) Int. Cl.
*F16M 11/04* (2006.01)
*G06F 1/16* (2006.01)
*F16B 2/12* (2006.01)

(52) U.S. Cl.
CPC ............ *F16M 11/041* (2013.01); *F16B 2/12* (2013.01); *G06F 1/1632* (2013.01); *G06F 1/1626* (2013.01)

(58) Field of Classification Search
CPC ... F16M 11/041; G06F 1/1632; G06F 1/1626; F16B 2/12
USPC .............................................. 248/346.04, 917
See application file for complete search history.

(56) References Cited

U.S. PATENT DOCUMENTS

| | | | |
|---|---|---|---|
| 9,470,356 B1* | 10/2016 | Zaloom | A47B 23/04 |
| 2013/0092811 A1* | 4/2013 | Funk | H05K 5/0204 248/371 |
| 2013/0120258 A1* | 5/2013 | Maus | A63F 13/245 345/161 |
| 2013/0148273 A1* | 6/2013 | Tsai | H04M 1/04 361/679.01 |
| 2014/0042285 A1* | 2/2014 | Carnevali | F16M 13/00 248/316.4 |
| 2014/0263931 A1* | 9/2014 | Chen | F16M 13/00 248/576 |
| 2015/0300050 A1* | 10/2015 | Van Balen | A47F 5/0087 248/551 |
| 2015/0359114 A1* | 12/2015 | Yang | F16M 11/04 248/161 |
| 2016/0108942 A1* | 4/2016 | Yu | F16M 13/00 248/316.4 |

(Continued)

FOREIGN PATENT DOCUMENTS

| | | |
|---|---|---|
| CN | 203809990 U | 9/2014 |
| CN | 209414889 U | 9/2019 |

OTHER PUBLICATIONS

Machine translation of CN203809990U Date: Sep. 2014; Liu Shuwei (Year: 2014).*

(Continued)

*Primary Examiner* — Muhammad Ijaz
(74) *Attorney, Agent, or Firm* — Martin & Ferraro, LLP (57) ABSTRACT

The present disclosure relates to a holder for a tablet electronic device that comprises: a base member having a slot formed on the base member; and a main clamp including a stand mounted to the base member and extending upwardly and an arm arranged at one end of the stand and extending substantially perpendicularly from the stand. The arm comprises at least one flexible fastener protruding from a bottom of the arm. Further, a position of the at least one flexible fastener corresponds to a position of the slot.

17 Claims, 5 Drawing Sheets

(56) References Cited

U.S. PATENT DOCUMENTS

2017/0188724 A1* 7/2017 Lin .................... F16M 11/041
2020/0109812 A1* 4/2020 Yang .................... F16M 13/00

OTHER PUBLICATIONS

Office Action and Search Report from Taiwan Intellectual Property Office (TIPO) for TW counterpart patent application No. 108135604; search report in English only.

* cited by examiner

HOLDER FOR A TABLET ELECTRONIC DEVICE

BACKGROUND

1. Field of the Invention

The instant disclosure relates to a holder for a tablet electronic device, especially for holding a tablet computer.

2. Description of Related Art

In recent years, tablet electronic devices, such as tablet computers, have become increasingly popular in the consumer and business markets. The issue of how to hold such tablet electronic devices stably and safely (e.g., in a vehicle) is an important practical matter for users. A common tablet electronic device holder usually comprises a base member for supporting a tablet electronic device and a clamp for clamping the tablet electronic device which is supported on the base member. The clamp is usually made of flexible materials, such as plastic, and thus has flexibility to clamp the tablet electronic device. However, such flexible clamp usually cannot provide sufficient clamping force to fixedly clamp the tablet electronic device. Once the holder is moved or shaken, the tablet electronic device may come loose from the clamp and slip out of the holder. In addition, since the clamp must be made of flexible materials to enable it to clamp the tablet electronic device, the clamp will be subject to fatigue failure after extended use.

SUMMARY OF THE INVENTION

The instant disclosure relates to a holder for a tablet electronic device, which can stably and safely hold the tablet electronic device.

According to one exemplary embodiment of the instant disclosure, a holder for a tablet electronic device comprises: a base member having a slot formed on the base member; and a main clamp including a stand mounted to the base member and extending upwardly and an arm arranged at one end of the stand and extending substantially perpendicularly from the stand. The arm comprises at least one flexible fastener protruding from a bottom of the arm. Further, a position of the at least one flexible fastener corresponds to a position of the slot of the base member.

According to another exemplary embodiment of the instant disclosure, a holder for a tablet electronic device comprises: a base member having a slot formed on the base member and extending along a lengthwise direction of the base member; and a main clamp, which includes: a stand mounted to the base member and extending substantially perpendicular to the lengthwise direction of the base member; an arm arranged at one end of the stand and extending above the slot; and at least one flexible fastener protruding from a bottom of the arm. Further, a position of the at least one flexible fastener corresponds to a position of the slot of the base member.

According to another exemplary embodiment of the instant disclosure, clamp for a holder of a tablet electronic device comprises: a stand; an arm arranged at one end of the stand and extending substantially perpendicularly from the stand; and at least one flexible fastener protruding from a bottom of the arm.

In order to further understand the instant disclosure, the following embodiments are provided along with illustrations to facilitate appreciation of the instant disclosure; however, the appended drawings are merely provided for reference and illustration, without any intention to limit the scope of the instant disclosure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings. In the drawings.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

The detailed description set forth below is intended as a description of various configurations of the present invention and is not intended to represent the only configurations in which the present invention may be practiced. It will be apparent, however, to those of ordinary skill in the art that the present invention is not limited to the specific details set forth herein and may be practiced without these specific details.

The embodiments will now be described with reference to the accompanying drawings, wherein like reference numerals designate corresponding or identical elements throughout the various drawings.

Figure 1:
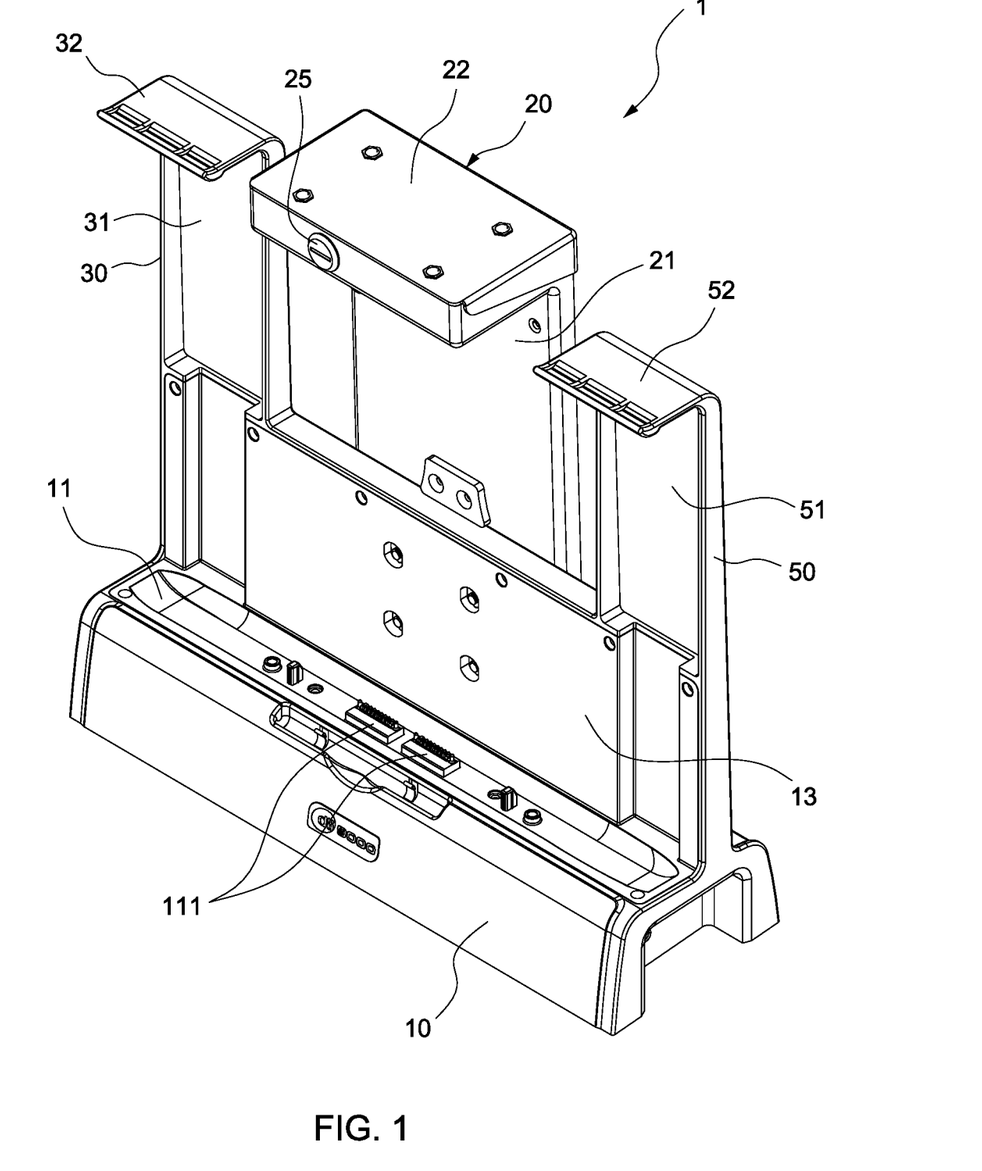
FIG. 1 is a perspective view of a holder for a tablet electronic device in accordance with an embodiment of the instant disclosure.

FIG. 1 shows a holder 1 for a tablet electronic device in accordance with an embodiment of the instant disclosure. With reference to FIG. 1, the holder 1 may comprise a substantially elongated base member 10. A slot 11 may be formed on the base member 10 and extend along a lengthwise direction of the base member 10. The slot 11 may be used for receiving the tablet electronic device when the tablet electronic device is held by the holder 1. Further, a plurality of connection ports 111 may be arranged within the slot 11 and these connection ports 111 may be used to connect the tablet electronic device.

The base member 10 may comprise a rear wall 13. The rear wall 13 may be arranged adjacent to the slot 11 and extend along the lengthwise direction of the slot 11. In other words, the rear wall 13 may extend parallel to the slot 11.

Referring to FIG. 1, the holder 1 may comprise a main clamp 20. The main clamp 20 may comprise a stand 21 and an arm 22. The stand 21 may be attached to the rear wall 13 of the base member 10 and substantially perpendicular to the lengthwise direction of the base member 10 and to the lengthwise direction of the slot 11. The arm 22 may be hollow and arranged at a top end of the stand 11. As shown in FIG. 1, the arm 22 may extend perpendicularly from the stand 21 and above the slot 11.

Two secondary clamps 30 and 50 may be arranged adjacent to two opposite ends of the base member 10. Each of the secondary clamps 30 and 50 may comprise a stand 31, 51 and a flexible arm 32, 52. The stand 31, 51 may be mounted to the base member 10 and substantially perpendicular to the lengthwise direction of the base member 10 and to the lengthwise direction of the slot 11. The flexible arm 32, 52 may be arranged at the top end of the stand 31, 51 and extend perpendicularly from the stand 31, 51 and above the slot 11. Moreover, the secondary clamps 30 and 50 may be integrated with the base member 10.

Figure 2A:
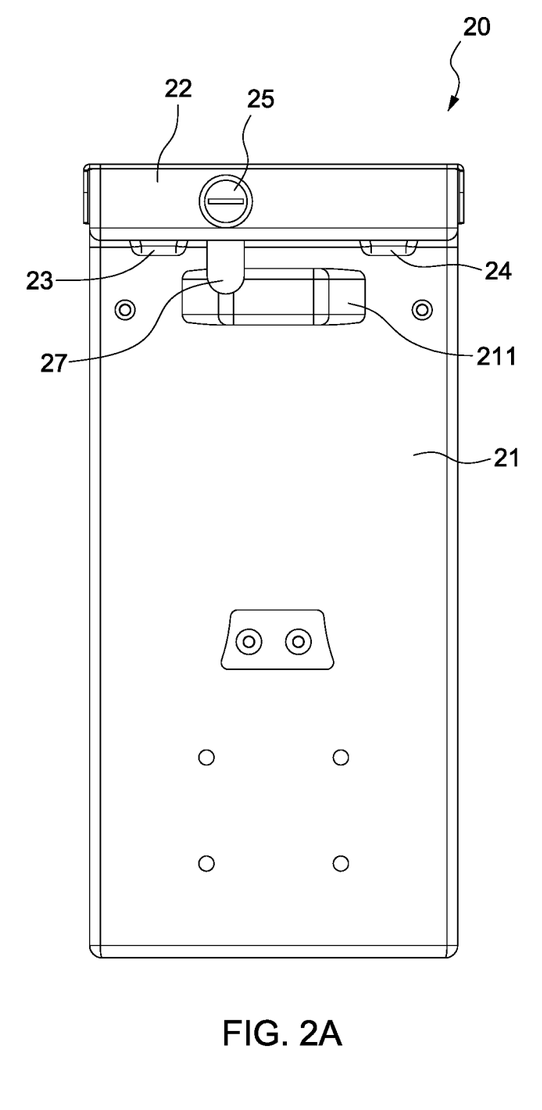
FIG. 2A is a front view of a main clamp of the holder as disclosed in FIG. 1.
Figure 2B:
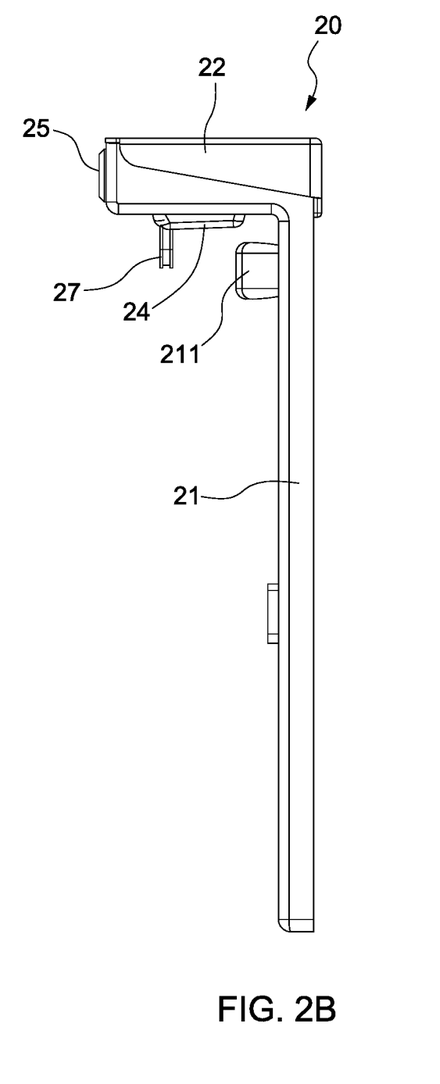
FIG. 2B is a side view of the main clamp of the holder as disclosed in FIG. 2A.

FIGS. 2A and 2B show the main clamp 20 of the holder 1 in accordance with an embodiment of the instant disclosure. With reference to FIGS. 2A and 2B, the arm 22 may comprise two flexible fasteners 23, 24. These two flexible fasteners 23, 24 may protrude from a bottom surface of the arm 22 and correspond to the position of the slot 11 of the base member 10. The flexible fasteners 23, 24 will be retracted toward the arm 22 when the flexible fasteners 23, 24 are compressed by a force. Further, the flexible fasteners 23, 24 will resume to protrude from the bottom surface of the arm 22 after the force is released.

The arm 22 may further comprise a locking mechanism including a switch 25 and a movable stop 27. The switch 25 may be arranged at a front face of the arm 22, and the movable stop 27 may movably protrude from a bottom of the arm 22. The switch 25 controls the movable stop 27. When a user uses a key to turn the switch 25, the movable stop 27 will move accordingly. In particular, referring to FIG. 2C, which is an exploded view of the main clamp 20 of the holder 1 as disclosed in FIGS. 2A and 2B, in the current embodiment, the switch 25 is a lock with a cylindrical body and the movable stop 27 extends from a distal end of the body orthogonally so that when the user uses a key to turn the lock 25 (e.g., in a clockwise direction), the movable stop 27 will be turned correspondingly and protrude from the bottom of the arm 22.

Further, referring to FIG. 2B, a distance between the movable stop 27 and the stand 21 may be greater than or equal to a distance between the fasteners 23, 24 and the stand 21, i.e., the fasteners 23, 24 are arranged between the movable stop 27 and the stand 21.

Figure 2C:
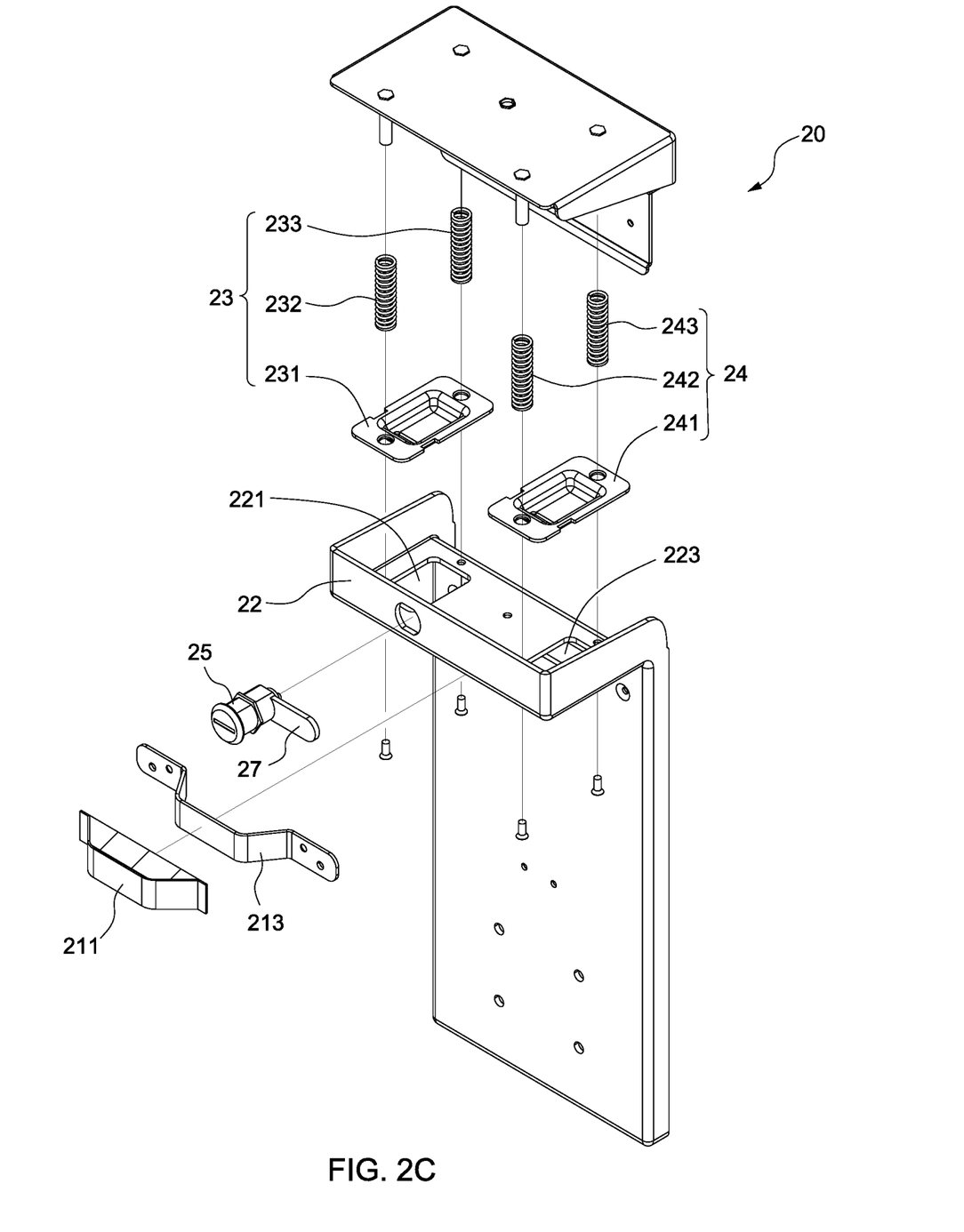
FIG. 2C is an exploded view of the main clamp of the holder shown in FIGS. 2A and 2B.

In addition, as shown in FIGS. 2A-2C, the stand 21 may further comprise a flexible block 211 disposed at a front face of the stand 21. The flexible block 211 will be retracted toward the stand 21 when the flexible block 211 is compressed by a force and will resume its original state after the force is released. Further, referring to FIG. 2C, the flexible block 211 may be hollow and enclose a spring plate 213. When the flexible block 211 is compressed by a force, the flexible block 211 will be moved toward the stand 21 and the spring plate 213 will be compressed accordingly. When the force is released, the spring plate 213 will push the flexible block 211 to resume its original state.

With reference to FIG. 2C, each of the flexible fasteners 23, 24 may comprise a buckle 231, 241 and two elastic members or springs 232 and 233, 242 and 243. The buckles 231 and 241 may be arranged on an inner bottom surface of the arm 22 and comprise the protrusions which respectively extend through apertures 221, 223 and thus protrude from the bottom surface of the arm 22. Further, the springs 232 and 233 may be arranged between the buckle 231 and a top inner surface of the arm 22, wherein one end of each spring 232 and 233 may abut against the buckle 231 and the other end of each spring 232 and 233 may abut against the top inner surface of the arm 22. Likewise, the springs 242 and 243 may be arranged between the buckle 241 and the top inner surface of the arm 22, wherein one end of each spring 242 and 243 may abut against the buckle 241 and the other end of each spring 242 and 243 may abut against the top inner surface of the arm 22. Based on the above structure, when the flexible fasteners 23, 24 are compressed by a force, the buckles 231 and 241 will be moved toward the interior of the arm 22 and the springs 232, 233, 242, 243 will be compressed accordingly. When the force is released, the springs 232, 233, 242, 243 will push the buckles 231, 241 such that the protrusions of the buckles 231, 241 extend through the apertures 221, 223 and protrude from the bottom of the arm 22.

Figure 3A:
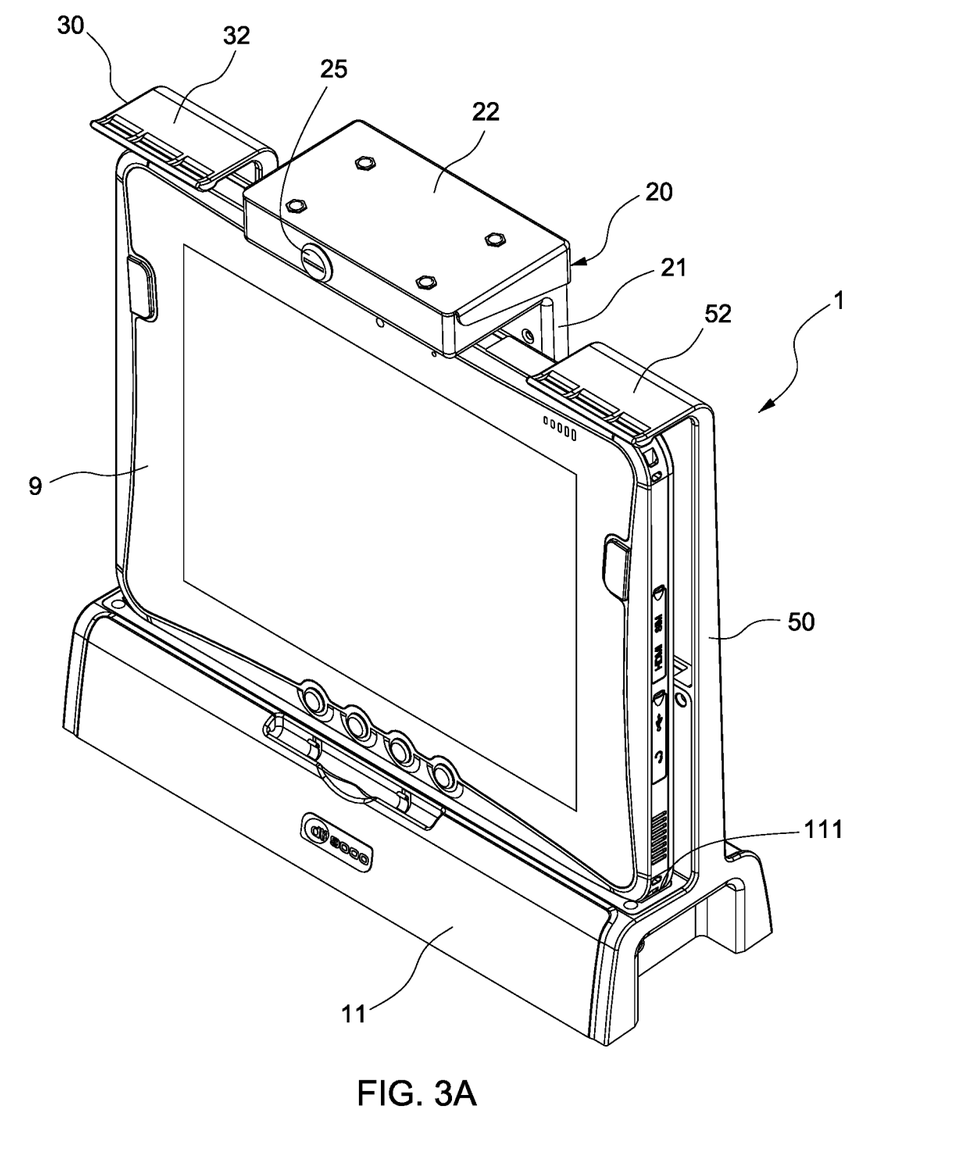
FIG. 3A shows a state of use of the holder as disclosed in FIG. 1.
Figure 3B:
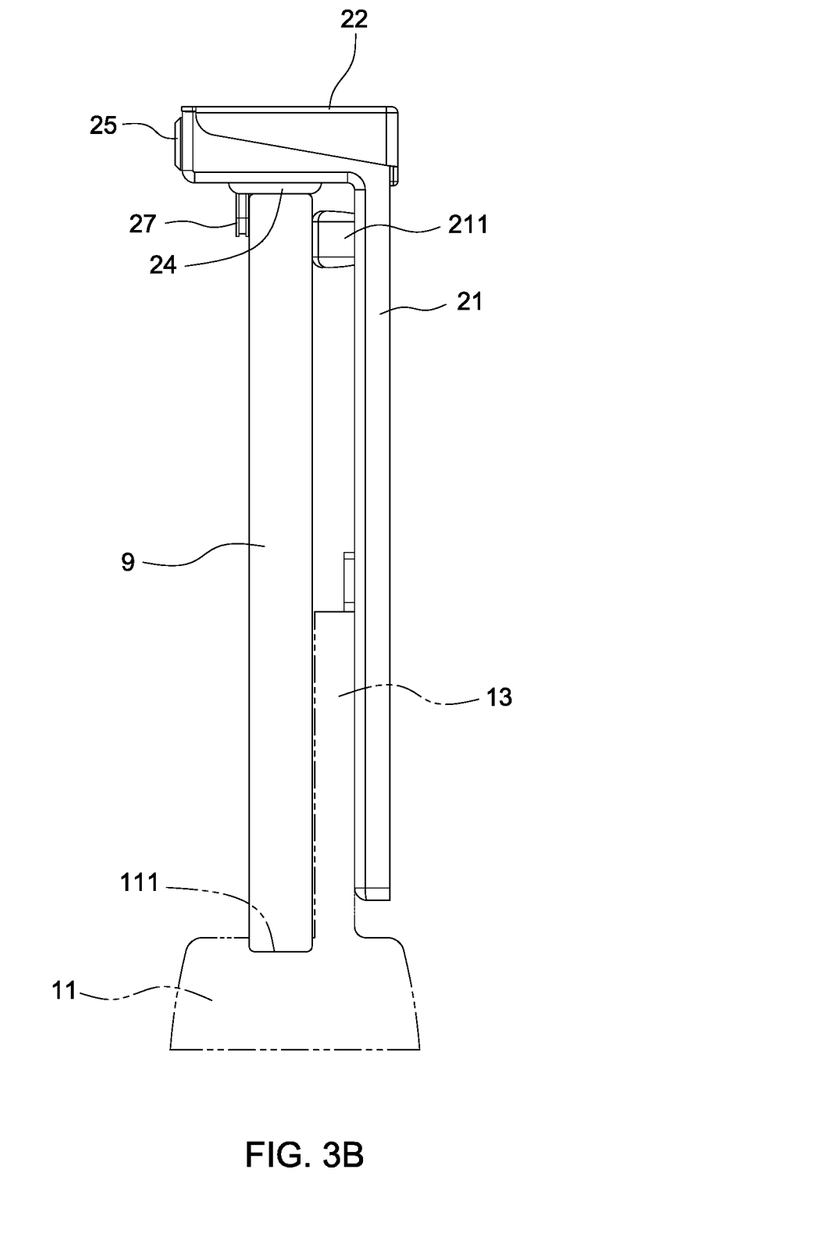
FIG. 3B is a side schematic view showing a state of use of the holder as disclosed in FIG. 1.

FIGS. 3A and 3B show a state of use of the holder 1. As shown in FIGS. 3A and 3B, in the current embodiment, the tablet electronic device is a tablet computer 9 and is held by the holder 1. A bottom of the tablet computer 9 is inserted into the slot 11 of the base member 10 of the holder 1, and the ports 111 in the slot 11 are connected to ports of the tablet computer 9 (not shown). Further, a top of the tablet computer 9 substantially abuts against the bottom of the arm 22, and thus the main clamp 20 clamps the top of the tablet computer 9. When the bottom of the tablet computer 9 is received in the slot and the top of the tablet computer 9 is clamped by the main clamp 20, the top of the tablet computer 9 pushes the buckles 231 and 241 of the fasteners 23 and 24 (referring to FIG. 3B). The buckles 231 and 241 move toward the interior of the arm 22 and compress the springs 232 and 233, 242 and 243. That is, the springs 232 and 233, 242 and 243 apply an elastic force to the buckles 231 and 241, and thus the buckles 231 and 241 will tightly engage with the top of the tablet computer 9. In addition, the top of the tablet computer 9 is clamped by the secondary clamps 30 and 50 as well. As shown in FIG. 3A, the top of the tablet computer 9 substantially abuts against flexible arms 32 and 52 of the secondary clamps 30 and 50. That is, the flexibility of the flexible arms 32 and 52 allows them to engage with the top of the tablet computer 9.

Depending on the elastic members or springs used, the elastic force applied to the buckles 231 and 241 is thus adjustable. Further, the springs can be replaced with other mechanisms, for example, an electromagnetic device or a hydraulic device.

Further, when the tablet computer 9 is held by the holder 1, a rear surface of the tablet computer 9 substantially abuts against the rear wall 13 of the base member 10 and the flexible block 211 disposed at the stand 21 of the main clamp 20 (referring to FIG. 3B). Meanwhile, the flexible block 211 moves toward the stand 21 and compresses the spring plate 213. That is, the spring plate 213 will apply an elastic force to push the flexible block 211 to move toward the rear surface of the tablet computer 9. Thus, the rear surface of the tablet computer 9 tightly abuts against the flexible block 211.

Based on the above, the tablet computer 9 will be tightly fixed to the holder 1. In addition, after the tablet computer 9 is fixed to the holder 1, the user can turn the switch 25 to rotate the moveable stop 27 such that the movable stop 27 protrudes from the bottom of the arm 22 and in front of the tablet computer 9. That is, the movable stop 27 blocks the tablet computer 9 so as to prevent the tablet computer 9 from falling forward.

It should be understood that aspects of the embodiments herein generally may be interchanged in whole or in part. The disclosure further includes the individual parts and/or combinations/subassemblies, methods of making the parts, methods of assembling the parts and methods of using the invention.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the broad scope of the following claims.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A holder for a tablet electronic device, comprising:
a base member having a slot formed on said base member; and
a main clamp including a stand mounted to said base member and extending upwardly and an arm arranged at one end of said stand and extending substantially perpendicularly from said stand;
wherein said arm comprises at least one flexible fastener protruding from a bottom of said arm, and said at least one flexible fastener is configured to engage the tablet electronic device when the tablet electronic device is received in said slot of said base member, said arm further comprises a locking mechanism having a movable stop protruding from said bottom of said arm, and a distance between said movable stop and said stand being greater than or equal to a distance between said flexible fastener and said stand.

2. The holder of claim 1, wherein said flexible fastener further comprises:
at least one buckle disposed within said arm, which has a protrusion extending through an aperture formed on said bottom of said arm; and
at least one elastic member disposed within said arm, which is arranged between said at least one buckle and a top inner surface of said arm.

3. The holder of claim 1, wherein said locking mechanism further comprises a switch connected to said movable stop and controlling said moveable stop.

4. The holder of claim 1, further comprising at least one secondary clamp, which includes:
a secondary stand mounted to said base member and extending upwardly; and
a flexible arm arranged at one end of said secondary stand of said secondary clamp and extending substantially perpendicular to said secondary stand.

5. The holder of claim 1, wherein said stand of said main clamp comprises a flexible block protruding from a front face of said stand.

6. The holder of claim 2, wherein said elastic member is a spring.

7. A holder for a tablet electronic device, comprising:
a base member having a slot formed on said base member and extending along a lengthwise direction of said base member; and a main clamp, which includes:
a stand mounted to said base member and extending substantially perpendicular to said lengthwise direction of said base member;
an arm arranged at one end of said stand and extending above said slot, said arm further comprising a locking mechanism which has a movable stop protruding from a bottom of said arm, and a distance between said movable stop and said stand being greater than or equal to a distance between at least one flexible fastener and said stand; and
said at least one flexible fastener protruding from said bottom of said arm, wherein said at least one flexible fastener is configured to engage the tablet electronic device when the tablet electronic device is received in said slot of said base member.

8. The holder of claim 7, wherein said flexible fastener further comprises:
at least one buckle disposed within said arm, which has a protrusion extending through an aperture formed on said bottom of said arm and protruding from said bottom of said arm; and
at least one elastic member disposed within said arm; wherein one end of said elastic member abuts against said buckle and the other end of said elastic member abuts against an inner top surface of said arm.

9. The holder of claim 7, wherein said locking mechanism further comprises a switch connected to said movable stop and controlling said movable stop.

10. The holder of claim 7, further comprising at least one secondary clamp; which includes:
a secondary stand mounted to said base member and extending substantially perpendicular to said lengthwise direction of said base member; and
a flexible arm arranged at one end of said secondary stand of said secondary clamp and extending above said slot.

11. The holder of claim 7, wherein said stand of said main clamp comprises a flexible block protruding from a front face of said stand.

12. A clamp for a holder of a tablet electronic device, comprising:
a stand;
an arm arranged at one end of said stand and extending substantially perpendicularly from said stand; and
at least one flexible fastener protruding from a bottom of said arm, said flexible fastener comprising:
at least one buckle disposed within said arm, which has a protrusion extending through an aperture formed on said bottom of said arm; and
at least one elastic member disposed within said arm, said elastic member being arranged between said at least one buckle and a top inner surface of said arm.

13. The clamp of claim 12, wherein said arm further comprises a locking mechanism, and said locking mechanism has a movable stop protruding from said bottom of said arm, and a distance between said movable stop and said stand is greater than or equal to a distance between said flexible fastener and said stand.

14. The clamp of claim 13, wherein said locking mechanism further has a switch connected to said movable stop and controlling said moveable stop.

15. The clamp of claim 12, wherein said stand comprises a flexible block protruding from a front face of said stand.

16. The clamp of claim 12, wherein said elastic member is a spring.

17. The clamp of claim 15, wherein the flexible block has a spring plate.

* * * * *